United States Patent [19]

Klippert et al.

[11] 4,424,301

[45] Jan. 3, 1984

[54] CONTINUOUS PROCESS AND DEVICE FOR THE MANUFACTURE OF A VINYL CHLORIDE POLYMER IN AQUEOUS SUSPENSION

[75] Inventors: Heinz Klippert; Eberhard Tzschoppe, both of Burgkirchen/Alz; Stratos Paschalis, Erftstadt-Liplar; Jürgen Weinlich, Eppstein/Taunus; Manfred Engelmann, Burghausen/Salzach, all of Fed. Rep. of Germany

[73] Assignee: Hoechst Aktiengesellschaft, Fed. Rep. of Germany

[21] Appl. No.: 288,351

[22] Filed: Jul. 30, 1981

[30] Foreign Application Priority Data

Aug. 7, 1980 [DE] Fed. Rep. of Germany ....... 3029907

[51] Int. Cl.$^3$ ............................ C08F 2/18; C08F 2/20
[52] U.S. Cl. ...................................... 525/53; 422/134; 526/62; 526/65; 526/330; 526/344.2
[58] Field of Search ...................... 525/53; 526/62, 65

[56] References Cited

U.S. PATENT DOCUMENTS

| | | | |
|---|---|---|---|
| 3,004,013 | 10/1961 | Kircher et al. | 526/65 |
| 3,562,238 | 2/1971 | Parks | 260/92.8 |
| 3,678,021 | 7/1972 | Chatelain et al. | 526/65 |
| 4,180,634 | 12/1979 | Koyanagi et al. | 526/62 |
| 4,209,600 | 6/1980 | Tytgat et al. | 526/74 |

FOREIGN PATENT DOCUMENTS

| | | |
|---|---|---|
| 1554499 | 10/1979 | United Kingdom . |
| 1575876 | 10/1980 | United Kingdom . |
| 1576597 | 10/1980 | United Kingdom . |
| 1596689 | 8/1981 | United Kingdom . |

*Primary Examiner*—Stanford M. Levin
*Attorney, Agent, or Firm*—Connolly and Hutz

[57] ABSTRACT

In the manufacture of polymer suspensions, good space-time yields, a narrow particle size distribution and good polymer properties are obtained in a relatively uncomplicated apparatus which includes a plurality of reactors having a length/diameter ratio of at least 4, the first reactor standing vertically and the others approximately horizontally. Plug flow of the polymerization mixture is maintained in the reaction zones provided by the reactors. In the first such zone, up to 10% of the polymerization is carried out, with agitation, preferably at a stirring energy per unit volume of 0.1 to 5 kWm$^{-3}$. Wall encrustation is substantially prevented, particularly in the second reaction zone, through the use of smooth, non-metallic surfaces in the zone.

5 Claims, 1 Drawing Figure

CONTINUOUS PROCESS AND DEVICE FOR THE MANUFACTURE OF A VINYL CHLORIDE POLYMER IN AQUEOUS SUSPENSION

The invention relates to a continuous process for the manufacture of a vinyl chloride polymer in aqueous suspension according to patent claim 1 and to a device according to patent claim 8.

Vinyl chloride has already been polymerized in an aqueous dispersion on a large industrial scale for many years. Whereas polymerization in an aqueous emulsion in the presence of water-soluble emulsifiers and activators was carried out continuously as early as the start of industrial development and this process is also still largely used in industry today, the discontinuous (batchwise) polymerization process has been preferred hitherto for the polymerization of vinyl chloride in an aqueous suspension in the presence of water-soluble suspending agents (protective colloids) and oil-soluble activators. As a result of the continuous increase in the sales of the mass-produced plastic polyvinyl chloride and its competition with other mass-produced plastics, it has for some years been necessary to manufacture at increasingly lower costs, and it has been possible to manufacture in ever increasing quantities. In such a situation, it is attractive to manufacture vinyl chloride continuously by the suspension process too, since such a process as a rule enables better space-time yields to be obtained than in a discontinuous process, and the disadvantage of a continuous process, of reacting relatively sluggishly to changes in grade, becomes increasingly less important in view of the increasingly greater opportunities of selling a particular grade.

Although, as a result of technical applications over many years, a large number of processes and process improvements have been known for the continuous emulsion polymerization of vinyl chloride, technical development in regard to suspension polymerization has hitherto proceeded mainly in the direction of continuing to manufacture by batch processes, but in increasingly large units. The reason for this is probably primarily that the techniques which are known for continuous emulsion polymerization cannot be applied to a corresponding continuous suspension plymerization process without some difficulty, that is to say cannot be applied in accordance with the considerations with which the expert is familiar.

Amongst present developments in the field of continuous suspension polymerization of vinyl chloride, a process is disclosed in U.S. Pat. No. 3,007,903 in which polymerization is carried out in a large number, preferably 5 to 10, of zones arranged in tandem. These zones are represented by a corresponding number of stirred kettles, the reaction medium overflowing from one kettle into the next kettle placed below it. The zones can also be sectors of a tubular reactor. An inert gas is passed through the various zones in co-current with the polymerization liquor, in order to prevent blockage of the passages from one zone into another zone.

German Auslegeschrift No. 1,217,069 also discloses a device for the continuous polymerization of ethylenically unsaturated polymerizable compounds, including vinyl chloride, which comprises a reaction space which has rotational symmetry and is sub-divided into chambers by rotationally symmetrical elements, the chambers being connected with one another by small apertures and enabling the reaction material to flow only in the principal direction of flow of the polymerization material. In the simplest case, the rotationally symmetrical elements are disks, separated from the walls of the reaction space by narrow annular gaps. These disks are attached to a rotating drive shaft, at intervals which are chosen to suit the particular requirements. An attached drawing shows increasing intervals between disks in the direction of flow of the polymerization material, the ratio of the length to the diameter of the chambers which are sub-divided by the disks being about 0.1 to 0.6. A blade stirrer is mounted on the rotating axis in the last chamber following the direction of flow. The device is described as particularly suitable for emulsion polymerization, but it is also stated to be applicable to polymerization in an aqueous suspension.

A further device, particularly for the continuous suspension polymerization of vinyl chloride, is disclosed in German Auslegeschrift No. 2,343,788. It comprises a central, tubular reaction space and a shaft which passes vertically through this reaction space, the reaction space being divided into chambers by separating elements and the chambers being connected with one another by means of small apertures in the separating elements. These chambers carry ring pipelines, which are connected to one chamber each by two apertures. In all the chambers, stirring elements can be mounted on the shaft passing through the chambers. The elements separating the chambers in the central reaction space from one another are advantageously attached to the walls of this reaction space and leave an opening in the center free, through which the shaft on which the stirring elements are attached passes. It is stated to be appropriate to use 5 to 30 stages (chambers plus ring pipeline). The drawing attached shows a device having 9 chambers, 7 of which have ring pipelines. An illustrative embodiment describes the polymerization of vinyl chloride in an apparatus corresponding to the drawing, which has no stirring elements on the shaft which passes through. In general, the whole device is made of stainless steel. In this connection, care is taken that the internal surfaces formed are as smooth as possible, in order not to form starting points for deposits.

As can be seen from the publications mentioned first and last, deposition on the wall constitutes a problem in the continuous suspension polymerization of vinyl chloride. In the process mentioned first, attempts are made to keep at least the points which are most sensitive to blockage, the delivery pipes, free by blowing gas through them. This method is not suitable for carrying out the process substantially without wall incrustations in the reaction spaces too, and for avoiding the difficulties caused thereby, such as impairment of heat transfer, contamination of the polymer by coarse particles and the like. In addition, blowing gas through the material can lead to considerable difficulties in the case of polymerization batches which have a tendency to foam because of their increased content of surface-active substances. In the second process mentioned, the problem of wall incrustations is not discussed at all but they will certainly occur in the chambers which are subdivided by the disks and will render a laborious cleansing operation necessary. The same applies to the apparatus, which is in any case very complicated, in accordance with the third publication described. Although it is stated here that incrustations are prevented by smooth interior surfaces and cleansing of the reactor is alleged not to be necessary, it is then stated, however, that occasionally some wall incrustation can be formed, which is removed by having to shut down the whole apparatus and to cleanse it with the aid of a solvent, for example tetrahydrofurane. In the case of a large industrial plant, considerable quantities of solvent are required for this purpose, and have to be separately stored and re-processed, which, in addition to the considerable outlay required in any case for the comparatively complicated polymerization apparatus, also means an additional outlay in terms of process technology.

Recently, a large number of processes have been disclosed for preventing wall incrustations in the suspension polymerization of vinyl chloride. These processes and the general problem of preventing wall incrustations in the suspension polymerization of vinyl chloride from the subject of an article by Kaltwasser, Weber and Thümmler in the journal "Plaste und Kautschuk" 26th year of issue, no. 10, 1979, pages 552 to 555. They report that the formation of incrustations as a function of the conversion is particularly marked in the initial phase of the polymerization (loc. cit., page 554, left hand column and third from last paragraph).

A process has now been found which makes it possible to manufacture, in good space-time yields, products of a narrow particle size distribution in an apparatus which has comparatively little complication and does not exhibit the shortcomings of the devices described earlier in the text and can, if necessary, be cleansed easily. It was particularly surprising to discover that effective prevention of wall incrustations can be achieved by processes which are in themselves known, if these processes are not used until after the initial phase of the polymerization, that is to say when the particle size morphology is already essentially established. This has the advantage that it is not necessary to employ, in the phase of the polymerization critical for the shape of the particles, any additives which prevent incrustations and which can disturb the establishment of the particle shape and/or in the shape of wall coatings can impair the heat transfer from the polymerization liquor to the wall of the kettle and thus make it more difficult to control the temperature of the polymerization liquor. It has also been found that wall coatings which prevent incrustations do not necessarily have to be used up to the end of the polymerization, so that it is also possible to carry out the reaction in the end phase using surfaces which enable good heat transfer to be obtained, which is advantageous in view of avoiding the "heat peak" which occurs towards the end of the polymerization.

The invention relates to a continuous process for the manufacture of a vinyl chloride polymer by homopolymerization, copolymerization or graft polymerization of vinyl chloride, if appropriate in the presence of one or more monomers which can be copolymerized with vinyl chloride and/or of one or more polymers which can be graft polymerized with vinyl chloride, in an aqueous suspension, in the presence of one or more activators which decompose to form free radicals, and of surface-active substances and further additives, in at least two reaction zones in which the polymerization mixture is kept sufficiently in motion for the polymer formed not to settle out, polymerization being carried out in the first reaction zone up to a conversion of not more than 10% by weight, relative to monomers employed, the mixture being cooled after leaving the last reaction zone, depressurized and freed from unreacted monomers and, after removing the bulk of the aqueous liquor, processed to give a dry polymer powder, which process comprises maintaining plug flow of the polymerization mixture in all the reaction zones, agitating the polymerization mixture in the first reaction zone in a manner adequate to establish the desired particle size morphology and, particularly in the second reaction zone, preventing the formation of polymer incrustations on the surfaces which come into contact with the polymerization mixture.

The invention also relates to a device for the continuous manufacture of vinyl chloride polymers, comprising several reactors arranged in tandem, the first of which at least contains a stirrer and each reactor contains a double jacket for controlling the temperature of the contents of the container and also, at one end, at least one aperture for admitting liquid, and, at the opposite end, at least one aperture for removing liquid and, if appropriate, between the two ends, further apertures for admitting liquid and also, at the highest point of the reactor, an aperture for admitting or removing gas, and, if appropriate, contains further internal fitments and/or attachments, wherein at least two reactors are used, each of which has a cylindrical internal space in which the ratio of length to diameter is at least 4, and the first reactor has a multi-stage stirrer.

The size of the reaction zones is appropriately adjusted to suit the desired residence time of the polymerization batch. This, in turn, depends on the conversion in the polymerization mixture, relative to polymerized vinyl chloride units. The reaction zones are preferably represented by separate vessels which are connected to one another by means of pipes. It is also possible, however, for two or more reaction zones, preferably the last reaction zones in the direction of flow, to be accommodated in a common vessel in which the zones are divided from one another by constrictions in the cross-section. Furthermore, it is also possible for a single reaction zone in the sense of the process described in greater detail above, to be composed, in turn, of different vessels or of one vessel having compartments.

Regardless of how many vessels or vessel compartments the individual reaction zone comprises, the polymerization mixture should pass through it in plug flow. This is to be understood as meaning flow in which a unit of volume undergoes virtually no mixing or only minor mixing in the direction of flow, whereas it can be subjected to intensive mixing to a greater or lesser extent vertically to the direction of flow.

Plug flow is achieved if the polymerization mixture is allowed to flow through tubular vessels which either contain no internal fitments at all or only such internal fitments as do not substantially hinder movement of the polymerization mixture in the direction of flow. It is preferable to employ blade stirrers, the blades of which are sub-divided, either continuously or at varying intervals, and move substantially in the direction of flow of the polymerization mixture and are mounted on an axis which is also arranged substantially in the direction of flow of the polymerization mixture. It is also important that the flow rate of the polymerization mixture, in relation to its viscosity or apparent viscosity, is not made too high, so that disturbances in the plug flow are avoided. Furthermore, no substances should be introduced into the polymerization mixture which remain in it is a gaseous form or which produce gases. Boiling of the polymerization mixture should also be avoided. If liquids are introduced into the polymerization mixture, this should not be effected against the direction of flow of the polymerization mixture.

In the individual reaction zones, the polymerization mixture must be kept in sufficient motion to prevent polymer particles from settling out. In favorable cases, for example with relatively small polymer particles which do not tend to settle out, this can be achieved merely by maintaining a certain flow rate in the reaction zones. Under less favorable conditions (large polymer particles and particularly those which readily tend to settle out), the polymerization mixture is agitated by stirrers in the reaction zones. These stirrers are appropriately constructed in such a way that they do not disturb, or only slightly disturb, the predominant plug flow of the polymerization mixture which is desired. Stirrers suitable for this purpose are described earlier in the text.

All the reaction zones should be of essentially cylindrical construction and should preferably have a length/diameter ratio of at least 4. If a single reaction zone comprises several vessels or several compartments of a vessel, the above also applies in each case to each individual vessel or to each individual compartment of a vessel. If the length/diameter ratio of the reaction zones is less than 4, in general it is not possible to achieve an adequately narrow particle size distribution of the polymerization product. Particularly in the case of the high space-time yields which are desired on economic grounds, fluctuations occur in the temperature of the polymerization mixture, and these in turn lead to fluctuations in the quality of the product obtained. The upper limit of the length/diameter ratio of the reaction zones is only set by design engineering problems, combined with economic considerations (increasing capital costs). In general, this ratio will not exceed 25 to 30. The length/diameter ratio of the reaction zones should preferably be 5 to 20, in particular 5 to 10. This applies, above all, to the first reaction zone in the direction of flow of the polymerization mixture, since its construction affects the quality of the product obtained more than the construction of the subsequent reaction zones.

It is an essential characteristic of the invention that different conditions can be established in the reaction zones, and the polymerization mixture only remains in the individual reaction zones until quite specific degrees of conversion have been achieved. In this context, a conversion is appropriately defined as the quantity of monomeric vinyl chloride which has been converted into polymerized vinyl chloride, relative to the total quantity of monomeric vinyl chloride originally employed. This conversion can, for example, be measured by taking repeated samples and analyzing the samples taken for their content of monomeric vinyl chloride and polyvinyl chloride, using known methods, or by measuring the quantity of heat evolved by the polymerization mixture.

On leaving the first reaction zone, the polymerization mixture should have reached a conversion of not more than 10% by weight, preferably 3 to 10% by weight, and particularly 5 to 8% by weight. If the conversion is less than 3% by weight, the desired narrow particle size distribution of the polymerization product will not be achieved. At a conversion higher than 10%, difficulties will occur in the first reaction zone through the formation of wall incrustations, which contaminate the product and make it more difficult to control the temperature of the polymerization mixture, so that it will be necessary to shut down and clean the plant more frequently, which reduces the space-time yield. Although known processes can be employed to reduce the wall incrustations, this requires the addition of substances which can disturb the establishment of the desired particle shape of the polymer and/or, in the shape of layers attached to the wall, hinder the heat transfer.

The process according to the invention is preferably carried out in three reaction zones. After leaving the second reaction zone, the polymerization mixture should have a conversion of 25 to 50%, preferably 30 to 45%. If the conversion remains below 25%, the difficulties mentioned above, arising from the formation of wall incrustations, will occur in the third reaction zone in the direction of flow. Although a conversion of over 50% of the polymerization mixture on leaving the second reaction zone is possible, in principle, without substantially harming the quality of the product, the space-time yield, and hence the profitability, will be adversely affected thereby, particularly if the formation of wall incrustations is prevented in this zone by means of a non-metallic wall surface, since the heat transfer from the polymerization mixture to the wall of the vessel in this zone is less than that in the third reaction zone, in which metallic wall surfaces can be used. Good removal of heat from the polymerization mixture is important, particularly in the conversion range above 50%, since it is in this conversion range that the greatest evolution of heat takes place, in general. If the heat removal is less effective, it would be necessary to carry out the reaction at a correspondingly lower throughput.

On leaving the third reaction zone, the polymerization mixture should have a conversion of 75 to 95%, preferably 85 to 95%. Conversion rates less than 75% generally reduce the yield, and hence the profitability, of the process without advantages which would compensate for this disadvantage. Conversion rates higher than 95% can generally only be achieved with difficulty and increased effort, inter alia increased polymerization time, without the benefit of a somewhat improved yield, which can be achieved thereby, justifying the increased effort.

The following are introduced continuously into the first reaction zone:

1. monomeric vinyl chloride and, if appropriate, further monomers which can be copolymerized with vinyl chloride, and also, if appropriate, polymers which can be graft polymerized with vinyl chloride, these polymers being appropriately used either as a solution in vinyl chloride or another monomer or as a dispersion in water. It is also possible to disperse a monomer, for example vinyl chloride, or several monomers, in water before introduction into the first reaction space;

2. deionized water;

3. suspending agents (protective colloids) and, if appropriate, emulsifiers, buffer substances and further polymerization auxiliaries which are appropriately used in the form of an aqueous solution or, if appropriate, also as a solution in water-miscible solvents, such as lower aliphatic alcohols or ketones;

4. activators (initiators) which decompose to form free radicals and are oil-soluble or soluble in monomeric vinyl chloride, and which are appropriately added as a solution or a fine dispersion. Suitable solvents are primarily vinyl chloride and/or other monomers which can be copolymerized with vinyl chloride. It is also possible to use, or to use concomitantly, other organic solvents for dissolving the activators. A suitable dispersion medium is primarily water. In exceptional cases it is also possible to use concomitantly water-soluble activators in an aqueous solution.

In the first reaction zone, the polymerization mixture which is fed in continuously is agitated by a multi-stage stirrer at a stirring power per unit volume of 0.1 to 5 kWm$^{-3}$, preferably 0.2 to 2 kWm$^{-3}$. Multi-stage stirrers are stirrers having a number of agitating elements which are mounted on the same axis at certain distances one upon the other, for example disk stirrers carrying, on a common axis, several disks at intervals above one another, on which are arranged paddle-shaped stirring elements or which have an indentation on the edge.

The stirring power per unit volume applied by the stirrer to the polymerization mixture can be determined easily from the measured power input of the stirrer drive, taking into account the volume, also measured, of the polymerization mixture in the first reaction zone. If the stirring power is less than 0.1 kWm$^{-3}$, there will in general be a broadening of the particle size distribution, additionally the average particle size will be too large and coarse particles will be formed to an increasing extent. If a stirring power per unit volume of 5 kWm$^{-3}$ is exceeded, a broadening of the particle size distribution will also be observed, additionally the average particle size of the polymer produced will generally be too small. Particularly good results are obtained within the range of a stirring power per unit volume of 0.2 to 2 kWm$^{-3}$.

The substances and mixtures of substances described in greater detail above, in particular the water or the aqueous solutions, which are fed into the first reaction zone, can appropriately be preheated before being fed in, for example using tubular or plate heat exchangers.

The surfaces with which the polymerization mixture is in contact in the first reaction zone can be composed of either a non-metallic or a metallic material which does not react with the polymerization mixture or only undergoes slight corrosion and appropriately has as smooth a surface as possible, having a peak-to-valley height less than 10 μm, preferably between 2 and 0.1 μm. The surfaces are advantageously composed of a metallic material, in particular stainless steel.

After the conversion described in greater detail earlier in the text has been achieved in the polymerization mixture, the latter is transferred from the first reaction zone into the second. Natural differences in level and/or pressure between the first and second reaction zones are appropriately used for this purpose.

Both in the second and, if appropriate, in the third and further reaction zones, the polymerization mixture should be moved at such a rate that polymer particles do not settle out; the movement should be effected in such a way that plug flow is substantially maintained in these reaction zones. For this purpose the vessels containing the second and, if appropriate, further reaction zones are equipped, for example, with blade stirrers.

The speed of rotation of the stirrer blades should be adjusted to such a rate that, taking into account the apparent viscosity of the polymerization mixture, plug flow is maintained in the reaction zone. In general, depending on the width of the stirrer blades, this is the case at about 10 to about 100 revolutions per minute. It is also possible to use other types of stirrer. Under particularly favorable circumstances, if the polymer particles exhibit only a slight tendency to settle out, it is possible not to stir the polymerization mixture at all, particularly in the second reaction zone.

In the second reaction zone, the polymerization mixture should appropriately be in contact virtually exclusively with non-metallic surfaces which are inert, that is to say do not react with the polymerization mixture and are not corroded by the mixture or, if so, only to a slight extent, and which must, in addition, be adequately resistant to abrasion.

The non-metallic surfaces are preferably composed of glass-like mineral materials, for example glass. Particularly good results are obtained when using enamel surfaces.

It is preferable to use, in addition, a third reaction zone in which the polymerization mixture is largely in contact with smooth, metallic surfaces. These surfaces should be inert, that is to say they should not react with the polymerization mixture and should only be slightly corroded by the latter, or not at all. Examples of suitable materials are: nickel, chromium and alloys having a high nickel content; corrosion-resistant stainless steel is preferably used. The peak-to-valley height of these surfaces should not exceed 10 μm.

After leaving the last reaction zone, the polymerization mixture is cooled in accordance with known processes, for example in a heat exchanger, depressurized and substantially freed from any unreacted monomers still present; the polymer which has been formed is separated from the bulk of the aqueous liquor and is dried, it being possible, if appropriate, also to employ measures for the further removal of unreacted monomers, during or after the drying process.

It is advantageous to add to the polymerization mixture one or more agents which are in themselves known and which prevent or at least retard the formation of incrustations on the vessel walls enclosing the reaction zones. This addition is, in particular, not effected until after the polymerization mixture has left the first reaction zone. Substances of this type are described, for example, in German Offenlegungsschriften Nos. 1,946,474, 2,631,325, 2,739,708, 2,745,085, 2,752,772, 2,804,076, 2,807,180 and 2,811,000; Belgian Patent Specification No. 845,012 and U.S. Pat. No. 3,926,910.

The process according to the invention is suitable for the continuous polymerization of vinyl chloride in an aqueous suspension in the presence of 0 to 30% by weight, relative to monomers employed, of monomers which can be copolymerized with vinyl chloride, good results being achieved in the presence of 0 to 15% by weight of copolymerizable monomers. In particular, the homopolymerization of vinyl chloride also gives good results. The process can also be used for the graft copolymerization of vinyl chloride, in which case other copolymerizable monomers besides vinyl chloride can also be present. In this case 0.1 to 15% by weight, preferably 1 to 10% by weight, of polymers which can be graft copolymerized with vinyl chloride, are employed.

The preparation, according to the invention, of the vinyl chloride homopolymers, copolymers or graft copolymers is carried out in the presence of 0.001 to 3% by weight, preferably 0.01 to 0.3% by weight, relative to monomers, of catalysts which form free radicals, such as, for example, diaryl or diacyl peroxides, such as diacetyl, acetylbenzoyl, dilauroyl, dibenzoyl, bis-2,4-dichlorobenzoyl or bis-2-methylbenzoyl peroxide; dialkyl peroxides, such as di-tert.-butyl peroxide, per-esters, such as tert.-butyl percarbonate; tert.-butyl peracetate, tert.-butyl peroctoate or tert.-butyl perpivalate; dialkyl peroxydicarbonates, such as diisopropyl, diethylhexyl, dicyclohexyl or diethylcyclohexyl peroxydicarbonates; mixed anhydrides of organic sulfo per-acids and organic acids, such as acetylcyclohexylsulfonyl peroxide; polymerization catalysts which can be employed are known azo compounds, such as azo isobutyronitrile, and also, if appropriate, additives comprising persulfates, such as potassium, sodium or ammonium persulfate, hydrogen peroxide, tert.-butyl hydroperoxide or other water-soluble peroxides and also mixtures of different catalysts, it being also possible to employ peroxide catalysts in the presence of 0.01 to 1% by weight, relative to monomers, of one or more reducing substances which are suitable for building up a redox catalyst system, such as, for example, sulfites, bisulfites, dithionites, thiosulfates and aldehyde-sulfoxylates, for example sodium-formaldehydesulfoxylate.

Polymerization is also carried out, if appropriate, in the presence of 0.01 to 1% by weight, preferably 0.05 to 0.3% by weight, relative to monomers, of one or more of the customary suspending agents (protective colloids), such as, for example, polyvinyl alcohol, optionally still containing up to 40 mole % of acetyl groups, cellulose derivatives, such as water-soluble methylcellulose, carboxymethylcellulose, hydroxyethylcellulose or methylhydroxypropylcellulose, and also gelatine and copolymers of maleic acid or of its half-esters with styrenes, polyvinylpyrrolidone and copolymers formed from vinyl acetate and vinylpyrrolidone.

In addition, the polymerization can be carried out in the presence of 0.01 to 1% by weight, relative to monomers, of one or more emulsifiers, the emulsifiers being employed as a mixture with the abovementioned suspending agents. Anionic, amphoteric, cationic and non-ionic emulsifiers can be used. Examples of suitable anionic emulsifiers are alkali metal, alkaline earth metal or ammonium salts of fatty acids, such as lauric, palmitic or stearic acid, of fatty alcohol sulfuric acid esters, of paraffinsulfonic acids, of alkylarylsulfonic acids, such as dodecylbenzenesulfonic or dibutylnaphthalenesulfonic acid, and of sulfosuccinic acid dialkyl esters, and also the alkali metal and ammonium salts of fatty acids containing epoxy groups, such as epoxystearic acid, or of reaction products of per-acids, for example peracetic acid, with unsaturated fatty acids, such as oleic of linoleic acid, or unsaturated hydroxy-fatty acids, such as ricinoleic acid. The following are examples of suitable amphoteric or cationic emulsifiers: alkylbetaines, such as dodecylbetaine, and alkylpyridinium salts, such as laurylpyridinium hydrochloride, and also alkylammonium salts, such as oxethyldodecylammonium chloride. The following are examples of suitable nonionic emulsifiers: fatty acid partial esters of polyhydric alcohols, such as glycerol monostearate or sorbitol monolaurate or monooleate; polyoxyethylene esters of fatty acids or aromatic hydroxy compounds; and polypropylene oxide/polyethylene oxide condensation products.

In addition to catalysts, suspending agents (protective colloids) and, if appropriate, emulsifiers, the polymerization can be carried out in the presence of buffer substances, for example alkali metal acetates or borax; alkali metal phosphates, alkali metal carbonates, ammonia or ammonium salts of carboxylic acids, and regulators of molecular weight, such as, for example, aliphatic aldehydes containing 2 to 4 carbon atoms, chlorinated or brominated hydrocarbons, such as, for example, dichloroethylene, trichloroethylene, chloroform, bromoform or methylene chloride, and mercaptans.

Examples of further suitable polymerization auxiliaries are to be found in H. Kainer "Polyvinylchlorid und Vinylchlorid-Mischpolymerisate" ("Polyvinyl Chloride and Vinyl Chloride Copolymers"), 1965 edition, pages 13 to 34.

One or more of the following monomers, for example, are suitable for the copolymerization reaction with vinyl chloride: olefins, such as ethylene or propylene, vinyl esters of straight-chain or branched carboxylic acids having 2 to 20, preferably 2 to 4, carbon atoms, such as vinyl acetate, propionate, butyrate or 2-ethylhexoate or vinyl isotridecanoic acid ester; vinyl halides, such as vinyl fluoride, vinylidene fluoride or vinylidene chloride, vinyl ethers, vinylpyridine and unsaturated acids, such as maleic, fumaric, acrylic or methacrylic acid and monoesters or diesters thereof with monoalcohols or dialcohols having 1 to 10 carbon atoms; maleic anhydride; maleimide and N-substitution products thereof containing aromatic, cycloaliphatic and, if appropriate, branched, aliphatic substituents; and acrylonitrile and styrene.

For the graft copolymerization reaction, it is possible to use, for example, crosslinked or non-crosslinked, elastomeric polymers which have been obtained by polymerizing one or more of the following monomers: dienes, such as butadiene or cyclopentadiene; olefins, such as ethylene or propylene; styrene, unsaturated acids, such as acrylic or methacrylic acid, and esters thereof with monoalcohols or dialcohols having 1 to 10 carbon atoms, acrylonitrile, vinyl compounds, such as vinyl esters of straight-chain or branched carboxylic acids having 2 to 20, preferably 2 to 4 carbon atoms, and vinyl halides, such as vinylidene chloride and vinyl chloride. The latter can, however, only be used together with at least one of the monomers previously mentioned.

The polymerization is carried out at temperatures of 30° to 80° C., preferably at 45° to 75° C., and, if appropriate, polymerization can be carried out using more than 2 stirrer speeds and/or several temperature levels. The pH value of the polymerization liquor should be between 2 and about 10.

One or more of the following substances can be added during the polymerization, if appropriate while maintaining the filled volume of the polymerization vessel constant: water, aqueous solutions, monomers, catalysts, co-catalysts and further polymerization auxiliaries, such as, for example, regulators, buffer substances, emulsifiers and suspending agents.

Pulverulent polymers obtained by the process according to the invention can be processed by thermoplastic methods, for example by extrusion, injection molding or calendering, like vinyl chloride suspension polymers which are customary at present.

The invention also relates to a device for the continuous manufacture of vinyl chloride polymers, which comprises several reactors arranged in tandem. Each of these reactors should contain a double jacket, which is used to control the temperature of the reactor contents and preferably has a liquid temperature control medium, for example water, flowing through it. In addition, the reactors can have further means of controlling the temperature of their contents, for example stirrers which can be cooled or other internal fitments.

Each reactor contains at one end at least one aperture for the admission of liquid and, at the opposite end, at least one aperture for the removal of liquid. In addition, further apertures for admitting liquid can be provided both at the ends of the reactors and between the latter. In particular, the first reactor in the direction of flow of the polymerization mixture appropriately contains several apertures for the admission of liquid at one end. A further aperture for the admission or removal of gases, for example nitrogen or other inert gases, is also provided on each reactor near to the highest point of the reactor.

At least the first reactor in the direction of flow of the polymerization mixture contains a stirrer. Preferably, each reactor contains a stirrer, the axis of which coincides approximately with the axis of the reactor. As already mentioned earlier in the text, the stirrers, and also any further internal fitments, are constructed in such a way that they do not disturb the plug flow which is desired in the reactors. In principle, any stirrers are suitable for this purpose which cause thorough mixing of the stirred material at right angles to the stirrer axis, thorough mixing in the direction of the stirrer axis being avoided to a large extent. Examples of suitable stirrers are blade stirrers having continuous or sub-divided blades, paddle stirrers or disk stirrers which carry, arranged at intervals above one another on a common axis, disks on which scoop-shaped stirring elements are mounted or which have an indentation at the edge, such as, for example, the "Ekatomizer" ® made by Ekato/-Schopfheim, Federal Republic of Germany. For the first reactor in the direction of flow of the polymerization mixture, it is preferable to use a multi-stage stirrer, for example one of the disk stirrers just described, having several disks one above the other. For the further reactors, it is preferable to employ blade stirrers having continuous or sub-divided blades, in particular stirrers in which the stirrer blades traverse about 20 to 90% of the space present in the reactor without thereby touching the reactor wall.

Examples of further possible internal fitments in the reactors are sensor sheaths, if appropriate cooled baffle plates and so-called cold fingers.

The reactors should have a cylindrical internal space with a length/diameter ratio of at least 4, preferably 5 to 20. If the ratio is less than 4, as this figure decreases, it becomes increasingly more difficult to maintain plug flow in the reactor, particularly at the high space-time yields which are desired. If the ratio is too high, for example much above 20, the constructional design of the reactors becomes more difficult and expensive and, in addition, it is no longer possible to employ moving stirrers having a rotational speed which can be adjusted accurately to the polymerization conditions desired. It is then only possible to obtain a desirable stirring action perpendicular to the reactor axis by means of fixed internal fitments, which cause cleaning problems, however.

The device according to the invention preferably comprises three reactors, since this division into three is best suited to the characteristics of the invention: the first stage being establishment of the particle size morphology; the second stage prevention of incrustations; and the third stage optimum heat removal.

A device in which the volumes of the three reactors arranged in tandem are in the ratio of 1:5 to 20:5 to 40 is particularly suitable for the purposes of the present invention. This means that if the first reactor has, for example, a volume of 10 liters, the second reactor should have a volume of 50 to 200 liters and the third reactor should have a volume of 50 to 400 liters.

This makes it possible to adjust the residence times of the polymerization mixtures in the individual reactions to accord well with the sense of the invention.

An embodiment of the device according to the invention which is also preferred is one in which the first reactor is arranged with its axis essentially vertical and the subsequent reactors are arranged with their axes inclined at an angle of 0° to 20° to the horizontal. The reactors are appropriately positioned in such a way that the polymerization mixture can be moved from one reactor into another by means of a natural difference of level, but, if appropriate, pressure differences between the individual reactors can also be used to move the polymerization mixture. The transfer pipelines between the reactors should not be too long and should have a cross-section which makes possible smooth forward transport of the polymerization mixture, while avoiding the formation of turbulent flow. These pipelines can have apertures for the admission of liquid. The reactors are appropriately equipped with devices for measuring and controlling the temperature, pressure and level of contents.

The customary stock containers and metering devices for the ingredients of the reaction mixture should be provided upstream of the first reactor. At the end of the last reactor it is appropriate to fit vessels which are used for depressurization and the removal of monomer from the polymer suspension which has been formed. The suspension which has been largely freed from monomers is then separated into a moist polymer and an aqueous liquor in customary equipment, for example centrifuges, and the moist polymer is then freed from adhering volatile constituents, in particular water and, in some cases, also small amounts of monomers, in drying equipment, such as pneumatic conveying driers or fluidized bed driers.

BRIEF DESCRIPTION OF THE DRAWING

The drawing consists of one figure which shows a typical example of a device according to the invention.

However, the invention is not limited to this example, thus, it is also possible to use two or more reactors arranged differently and having different length/diameter ratios and different stirrers or, if appropriate, even without stirrers, with the exception of the first reactor.

Figure 1:
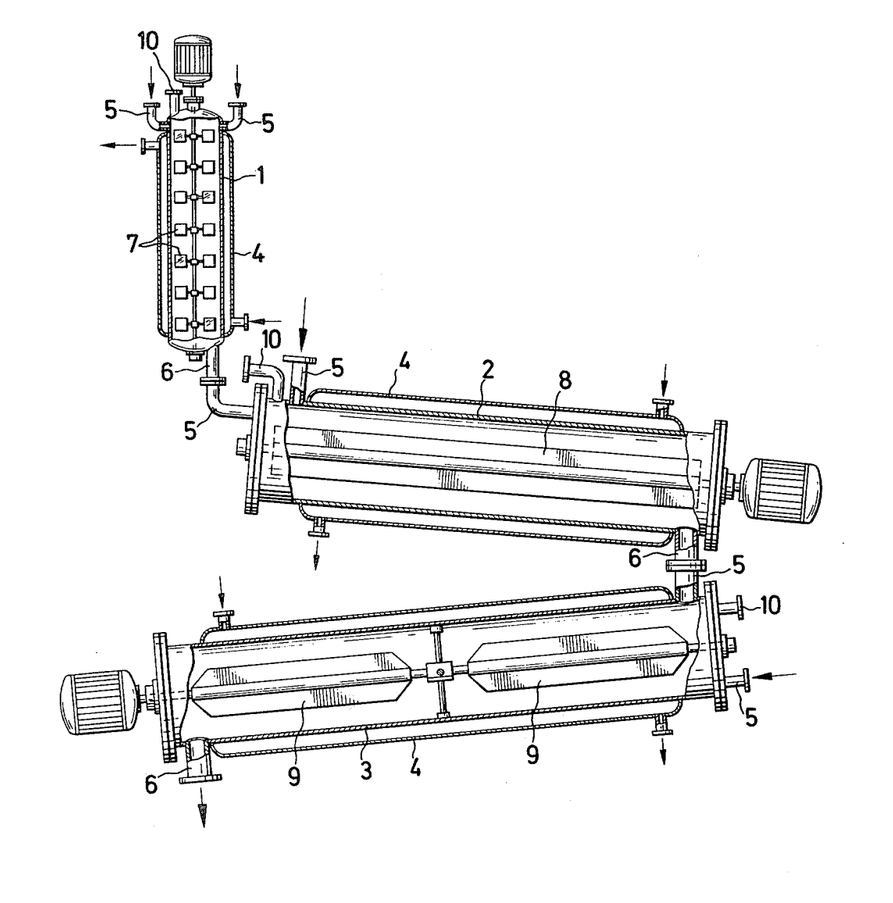

The FIGURE represents a diagrammatical sketch which shows a longitudinal section of the device, taking no account of the known and necessary equipment upstream or downstream thereof. In order to make the diagram clearer, sensors and possible further internal fitments have also been omitted.

DETAILED DESCRIPTION OF THE DRAWING AND EXAMPLES

The device comprises three reactors: 1; 2; and 3, having a cylindrical internal space, the first and second reactors having a length/diameter ratio of 5:1 and the third reactor having a length/diameter ratio of 6:1. The ratio of the reactor volumes is 1:8:9.6. Each reactor has a double jacket 4, the temperature of which can be controlled. Apertures 5 for the admission of liquid are provided at one end of each reactor, while an aperture 6 for the removal of liquid is provided at the opposite end in each case. The first reactor 1, in the direction of flow of the polymerization mixture, is arranged with its axis vertical, while the two subsequent reactors 2 and 3 are arranged above one another with their axes inclined at an angle of about 10° to the horizontal so that the polymerization mixture can pass through the three reactors by means of natural level difference. The first reactor 1 contains a multi-stage disk stirrer 7 which has agitator scoops and a stirrer axis which coincides with the axis of the vessel. The second and third reactors 2 and 3 each contain a blade stirrer 8 and 9 in which the stirrer axis again coincides with the axis of the reactor. In the third reactor 3, the stirrer blade 9 is sub-divided. Near to its highest point, each reactor, 1, 2 and 3, has an aperture 10 for the admission or removal of gas.

The process according to the present invention makes it possible, particularly if it is carried out in a device according to the invention, to manufacture, over a long period, without breakdowns, continuously and at good space-time yields, suspension polymers which contain principally polymerized vinyl chloride units and which are distinguished by a narrow distribution of particle size and also exhibit a constant and good pattern of properties over prolonged periods of manufacture. Compared with known processes, the new process has the advantage that it can be carried out in a relatively simple apparatus, which is easy to clean.

The following examples are intended to illustrate the invention in greater detail. The measured values indicated were obtained as follows:

Stirring power: The measured power input of the stirrer motor under load, less the input under no load, is divided by the volume of the stirred polymerization mixture.

Maximum conversion: This is the conversion on leaving a particular reactor, determined analytically from the quantity of polymers formed, divided by the quantity of monomer originally employed.

Space-time yield: This is calculated from the total quantity of polymer produced in the total running time shown, relative to the reaction space available for the polymerization. It is quoted in $Mgd^{-1}m^{-3}$.

Quantity of incrustation: After the running time indicated, the reactors were treated with tetrahydrofurane until the incrustations had apparently been removed. The solvent was removed by distillation from the tetrahydrofurane solution thus obtained and the residue was weighed.

Average particle size and average particle size distribution: The particle size distribution is determined as specified in DIN No. 53,734. The particle size distribution is plotted in a Rosin-Ramler and Sperling particle size grid and the average particle size (quoted in $\mu m$) and the slope of the particle size distribution curve (quoted as the tangent of the angle of slope $\alpha$) are obtained from this. Higher figures for this value mean a narrower particle size distribution.

K-value: Determined as specified in DIN No. 53,726, solvent: cyclohexanone.

Fraction coarser than 600 $\mu m$: determined analogously to DIN No. 53,734 using a sieve of mesh width 600 $\mu m$. The sieve residue is quoted as a percentage, relative to the total quantity of sieved material.

Comparison Test A:

An apparatus consisting of three reactors arranged in tandem is used. Each reactor has internal surfaces made of polished chrome-nickel steel (VA steel), with a peak-to-valley height of approx. 2 $\mu m$. The first reactor has a volume of 10 liters and a 1:1 ratio of length (height) to diameter. It is equipped with an impeller stirrer having a polished chrome-nickel steel surface. The second reactor has a capacity of 150 liters and a length/diameter ratio of 5:1 and is equipped with a blade stirrer having a polished chrome-nickel steel surface. The stirrer traverses about 70% of the total interior space of the reactor. The third reactor has a capacity of 300 liters and a length/diameter ratio of 5:1 and is also equipped with a blade stirrer having polished chrome-nickel steel surfaces. This stirrer traverses about 85% of the interior space of the reactor. All three reactors have double jackets, through which water flows as a medium for controlling the temperature. In addition the reactors contain equipment for measuring the temperature of the polymerization mixture, the pressure and the level of the liquid.

Continuous polymerization of vinyl chloride by the suspension process is carried out by introducing, with the aid of booster pumps, the quantities of monomeric vinyl chloride, water, activator and suspending agents, the latter in the form of solutions, indicated in the following table under A. The internal temperatures in the reactor which are also indicated in the table are kept constant after the start of the polymerization by suitable circulation of cooling water. The stirrers run at the following speeds of rotation: 1st reactor 600 minutes$^{-1}$, 2nd reactor 70 minutes$^{-1}$ and 3rd reactor 70 minutes$^{-1}$. The stirring power in the first reactor is shown in the table.

After leaving the third reactor, the polymerization mixture is depressurized and freed from excess, unreacted monomers, the bulk of the aqueous liquor is separated off in a centrifuge and the moist polymer is dried at 70° to 80° C. The measured values shown in the table are determined on the polymer thus obtained.

A considerable incrustation has formed in the reactors after as short a period as 12 hours. The polymerization is discontinued, the reactors are emptied and the quantity of incrustation is determined as described in greater detail above; it is shown in the table.

Comparison Example B:

An apparatus comprising three reactors arranged in tandem is used, the first and third of these being the same as that described in Comparison Test A. The second reactor has a capacity of 150 liters, interior walls made of polished chrome-nickel steel (VA steel) and a 1:1 ratio of length (height) to diameter and is equipped with an impeller stirrer, the surfaces of which are also composed of polished chrome-nickel steel. The process is carried out as described in Comparison Test A, the materials indicated in the table under B being charged and the temperatures also recorded in the table being maintained. The speeds of rotation of the individual stirrers are: 1st reactor 600 minutes$^{-1}$, 2nd reactor 170 minutes$^{-1}$ and 3rd reactor 70 minutes$^{-1}$. The product is worked up in a manner similar to that in Comparison Test A.

The test has to be discontinued after 20 hours, since a considerable incrustation has again been formed. After emptying the reactors, this incrustation is determined as described above and can be seen from the table which follows.

Comparison Test C:

An apparatus consisting of three reactors arranged in tandem is again used. The first two reactors are the same as those described under Comparison Test B; the third place is taken by a reactor which has a capacity of 150 liters and a 1:1 ratio of length (height) to diameter and in which the internal surfaces are composed of polished chrome-nickel steel (VA steel) and which is equipped with an impeller stirrer, the surfaces of which are also composed of polished chrome-nickel steel.

The procedure followed is again as described under Comparison Test A using the substances specified in the table under C. The anti-incrustation agent is fed into the line between the first and second reactors, in the form of an aqueous solution. The temperatures are also adjusted to the values indicated in the table. The speed of rotation of the stirrer in the individual reactors is: 1st reactor 600 minutes$^{-1}$, 2nd reactor 170 minutes$^{-1}$ and 3rd reactor 140 minutes$^{-1}$. Working up is carried out as indicated under Comparison Test A.

Constant reaction conditions are established only with difficulty, and even after 8 hours the reactors exhibit a considerable incrustation. The reaction is stopped, the reactors are emptied and the incrustation is determined. It is indicated in the table which follows.

EXAMPLE 1

The apparatus used comprises three reactors arranged in tandem, similar to that shown in FIG. 1. The first reactor has a capacity of 10 liters, a 10:1 ratio of length (height) to diameter, its internal surfaces are composed of polished chrome-nickel steel (VA steel) having a peak-to-valley height of 2 μm, and it is equipped with a disk stirrer which carries seven disks placed one above the other at equal intervals on a common axis, which coincides with the reactor axis, six scoop-like stirring elements being mounted on each disk at equal intervals. The stirrer is composed of polished chrome-nickel steel. The second reactor is composed of carbon steel and is enameled inside. It has a capacity of 150 liters and a length/diameter ratio of 5:1 and contains an enameled blade stirrer which traverses about 70% of the total internal space of the reactor. The third reactor has a capacity of 300 liters, internal surfaces composed of polished chrome-nickel steel (VA steel) having a peak-to-valley height of 2 μm, has a length/diameter ratio of 5:1 and contains a blade stirrer which has surfaces composed of polished chrome-nickel steel and which traverses 85% of the internal space of the reactor.

The procedure followed is again as described in Comparison Test A, the substances indicated in the table under 1 being employed and the temperatures specified being maintained. The substances are introduced into the first reactor and the polymerization mixture is worked up as indicated in Comparison Test A. The stirrers in the individual reactors have the following speeds of rotation: 1st reactor 600 minutes$^{-1}$, 2nd reactor 70 minutes$^{-1}$ and 3rd reactor 50 minutes$^{-1}$. The stirring power in the first reactor is indicated in the table.

The polymerization is discontinued after 504 hours, although only slight incrustations are found in the reactors. The reactors are emptied and the incrustation is determined as described earlier in the text. It is indicated in the table.

EXAMPLE 2

The same apparatus is used as in Example 1 and the procedure followed is also as described in that example, using the substances indicated in the table under 2. The anti-incrustation agent is fed into the line between the first and second reactors, in the form of an aqueous solution. The following speeds of rotation of the stirrers are employed in the reactors: 1st reactor 500 minutes$^{-1}$, 2nd reactor 70 minutes$^{-1}$ and 3rd reactor 50 minutes$^{-1}$.

The polymerization is discontinued after 650 hours, although only a slight incrustation is found on the reactor walls. The reactors are emptied and the incrustation is determined as described above. See the table for the figures.

EXAMPLE 3

The apparatus and procedure are as in Example 2. The speed of rotation of the stirrers in the reactors is as follows: 1st reactor 700 minutes$^{-1}$, 2nd reactor 70 minutes$^{-1}$ and 3rd reactor 50 minutes$^{-1}$. The stirring power in the first reactor is indicated in the table.

The polymerization is interrupted after 780 hours and the procedure described under Example 1 and 2 is followed. The quantity of incrustation measured is indicated in the table.

Example 4

The apparatus and procedure are as in Example 2. The speeds of rotation of the stirrers in the reactors are as in Example 1.

The polymerization is interrupted after 450 hours, the reactors are emptied and the incrustation formed is determined as described above. It is indicated in the table.

For the sake of clarity, the table which follows shows the results of the comparison tests and examples in a collated form. The abbreviations used have the following meanings:

Suspending agents:
SMA = partially saponified polyvinyl acetate, saponification number 270, a 4% strength by weight aqueous solution has a viscosity of 15 mPa.s at 20° C.;
SMB = partially saponified polyvinyl acetate, saponification number 285, a 4% strength by weight aqueous solution has a viscosity of 5 mPa.s at 20° C.;
SMC = methylhydroxypropylcellulose, a 2% strength by weight aqueous solution has a viscosity of 50 mPa.s at 25° C.

Activator:
BPND = t-butyl perneodecanoate
APND = t-amyl perneodecanoate
PDEH = di-2-ethylhexyl peroxydicarbonate
LPO = lauroyl peroxide.

Comonomer:
5 VAC = vinyl acetate.

Anti-incrustation agent:
Z1 = tartaric acid,
Z2 = carboxyethanephosphonic acid,
Z3 = sodium nitrite.

| | Description | Dimensions | Comparison tests | | | Examples | | | |
|---|---|---|---|---|---|---|---|---|---|
| | | | A | B | C | 1 | 2 | 3 | 4 |
| Polymerization mixture | Vinyl chloride | g/h | 25000 | 25000 | 25000 | 25000 | 25000 | 25000 | 22500 |
| | Type of comonomer | — | — | — | — | — | — | — | VAC |
| | Quantity | g/h | — | — | — | — | — | — | 2500 |
| | Water | g/h | 45000 | 45000 | 45000 | 45000 | 45000 | 45000 | 45000 |
| | Type of activator | — | BPND | PDEH | BPND | BPND | PDEH | APND | APND/LPO |
| | Quantity | g/h | 37.5 | 37.5 | 30.0 | 37.5 | 37.5 | 45 | 30/15 |
| | Type of suspending agent | — | SMA | SMA | SMA | SMA | SMB | SMC | SMA |
| | Quantity | g/h | 36 | 36 | 40 | 36 | 45 | 44 | 45 |
| | Type of anti- | — | — | — | Z1 | — | Z1 | Z2 | Z3 |

-continued

| | Description | Dimensions | Comparison tests A | B | C | Examples 1 | 2 | 3 | 4 |
|---|---|---|---|---|---|---|---|---|---|
| | incrustation agent Quantity | g/h | — | — | 2.4 | — | 2.4 | 2.4 | 2.4 |
| 1st Reactor | Temperature | °C. | 55 | 50 | 66 | 55 | 50 | 66 | 61 |
| | Stirring power | kWm$^{-3}$ | 0.5 | 0.5 | 0.5 | 0.5 | 0.3 | 0.9 | 0.5 |
| | Maximum conversion | % | 4 | 5 | 4 | 5 | 7 | 5 | 6 |
| 2nd Reactor | Temperature | °C. | 55 | 50 | 66 | 55 | 50 | 66 | 61 |
| | Maximum conversion | % | 35 | 33 | 35 | 30 | 30 | 30 | 30 |
| 3rd Reactor | Temperature | °C. | 55 | 50 | 66 | 55 | 50 | 66 | 61 |
| | Maximum conversion | % | 79 | 82 | 70 | 90 | 80 | 85 | 80 |
| Results of process | Running time | h | 12 | 20 | 8 | 504 | 650 | 780 | 450 |
| | Space-time yield | Mgdm$^{-1-3}$ | —$^1$ | —$^1$ | —$^1$ | 1.17 | 1.04 | 1.11 | 1.04 |
| | Quantity of incrustation | kg | 2.5 | 3.8 | 5.0 | 0.3 | 0.2 | 0.5 | 0.6 |
| Quality of polymer | Average particle size | μm | 320 | 400 | 300 | 150 | 130 | 150 | 120 |
| | Average particle size distribution | tgα | 1.8 | 2.0 | 1.0 | 6.2 | 5.5 | 7.4 | 4.8 |
| | K-value | — | 70 | 67 | 60 | 70 | 67 | 60 | 60 |
| | Fraction coarser than 600 μm | % by wt. | 5 | 10 | 15 | 0.1 | 0.2 | 0.05 | 0.15 |

$^1$It is not meaningful to quote a figure owing to the short running time

We claim:

1. A continuous process for the manufacture of a vinyl chloride polymer by homopolymerization of vinyl chloride or by copolymerization or graft polymerization of vinyl chloride, in the presence of one or more monomers which can be copolymerized with vinyl chloride and/or of one or more polymers which can be graft polymerized with vinyl chloride, in an aqueous suspension, in the presence of one or more activators which decompose to form free radicals, and of surface-active substances and further additives, in at least two reaction zones in which the polymerization mixture is kept sufficiently in motion for the polymer formed not to settle out, polymerization being carried out in the first reaction zone up to a conversion of not more than 10% by weight, relative to monomers employed, the mixture being cooled after leaving the last reaction zone, depressurized and freed from unreacted monomers and, after removing the bulk of the aqueous liquor, processed to give a dry polymer powder, which comprises that all the reaction zones have an essentially cylindrical construction and each reaction zone has a length/diameter ratio of at least 4, the polymerization mixture in the first reaction zone is agitated by a multi-stage stirrer at a stirring power per unit volume of 0.1 to 5 kWm$^{-3}$ and the polymerization mixture in the second reaction zone is exclusively in contact with inert, smooth, non-metallic surfaces.

2. A process as claimed in claim 1, wherein the first reaction zone has a length/diameter ratio of 5 to 20.

3. A process as claimed in claim 1 wherein the polymerization is carried out in three reaction zones, the conversion on leaving the second reaction zone being 25 to 50% by weight and on leaving the third reaction zone 75 to 95% by weight.

4. A process as claimed in claim 1 wherein the reaction zones are located in reactors which are spatially separated from one another.

5. A continuous process for manufacture of a copolymer or graft polymer containing homopolymerized or copolymerized or graft-polymerized vinyl chloride units, comprising:

(a) polymerizing in a first reaction zone in which the vinyl chloride monomer and the copolymerizable monomer or graft-copolymerizable polymer or mixtures thereof are in aqueous suspension in the presence of a surface-active substance and an activator which decomposes to form free radicals, and agitating the aqueous suspension with a multi-stage stirrer at a stirring power per unit volume of 0.1 to 5 kWm$^{-3}$, the polymerization in this first reaction zone being carried out up to a conversion of not more than 10% by weight, relative to the monomers employed, the agitation in the first reaction keeping the polymerization mixture sufficiently in motion for the polymer formed not to settle out, (b) continuing to polymerize in at least a second reaction zone in which the polymerization mixture is kept sufficiently in motion for the polymer formed not to settle out, and wherein the polymerization mixture is exclusively in contact with inert, smooth, non-metallic surfaces, and (c) removing from the polymerization mixture, after it leaves the last reaction zone, unreacted monomer and the bulk of the aqueous liquor, then processing the polymerization mixture into a dry polymer powder; each said reaction zone having an essentially cylindrical construction and a length/diameter ratio of at least 4.

* * * * *